(12) United States Patent
Jones et al.

(10) Patent No.: US 10,746,029 B2
(45) Date of Patent: Aug. 18, 2020

(54) TURBOMACHINE ROTOR BLADE TIP SHROUD CAVITY

(71) Applicant: General Electric Company, Schenectady, NY (US)

(72) Inventors: Jeffrey Clarence Jones, Simpsonville, SC (US); Robert Alan Brittingham, Greer, SC (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 15/426,159

(22) Filed: Feb. 7, 2017

(65) Prior Publication Data

US 2018/0328193 A1 Nov. 15, 2018

(51) Int. Cl.
| | | |
|---|---|---|
| *F01D 5/20* | (2006.01) | |
| *F01D 5/18* | (2006.01) | |
| *F01D 5/22* | (2006.01) | |
| *F02C 3/04* | (2006.01) | |

(52) U.S. Cl.
CPC ............... *F01D 5/20* (2013.01); *F01D 5/186* (2013.01); *F01D 5/225* (2013.01); *F02C 3/04* (2013.01); *F05D 2220/32* (2013.01); *F05D 2240/24* (2013.01); *F05D 2240/307* (2013.01); *F05D 2250/11* (2013.01); *F05D 2250/75* (2013.01); *F05D 2260/202* (2013.01)

(58) Field of Classification Search
CPC ..... F01D 5/12; F01D 5/18; F01D 5/20; F01D 5/085; F01D 5/088; F01D 5/147; F01D 5/186; F01D 5/187; F01D 5/225; F01D 11/08; F01D 11/10; F01D 25/12; F02C 3/04; F05D 2220/32; F05D 2240/24; F05D 2240/307; F05D 2250/11; F05D 2250/75; F05D 2260/202
USPC ........................................................ 415/115
See application file for complete search history.

(56) References Cited

U.S. PATENT DOCUMENTS

| | | | |
|---|---|---|---|
| 5,350,277 A | 9/1994 | Jacala et al. | |
| 6,471,480 B1 | 10/2002 | Balkcum, III et al. | |
| 6,517,312 B1 * | 2/2003 | Jones ...................... | F01D 5/189 |
| | | | 415/115 |
| 7,427,188 B2 | 9/2008 | Neuhoff et al. | |
| 7,568,882 B2 | 8/2009 | Brittingham et al. | |

(Continued)

FOREIGN PATENT DOCUMENTS

JP  H03194101 A  8/1991

*Primary Examiner* — Woody A Lee, Jr.
*Assistant Examiner* — Justin A Pruitt
(74) *Attorney, Agent, or Firm* — Dority & Manning, P.A.

(57) ABSTRACT

The present disclosure is directed to a rotor blade for a turbomachine. The rotor blade includes an airfoil having a leading edge and a trailing edge and defines a chord extending from the leading edge to the trailing edge. A tip shroud couples to the airfoil and includes a leading edge wall and a trailing edge wall and defines a tip shroud cavity. The tip shroud cavity includes a leading edge portion at least partially defined by the leading edge wall and positioned largely upstream of fifty percent of the chord. The tip shroud cavity also includes a trailing edge portion at least partially defined by the trailing edge wall and positioned largely downstream of fifty percent of the chord. An intermediate portion of the tip shroud cavity fluidly couples the leading edge portion of the tip shroud cavity and the trailing edge portion of the tip shroud cavity.

12 Claims, 5 Drawing Sheets

(56) References Cited

U.S. PATENT DOCUMENTS

| | | | |
|---|---|---|---|
| 7,946,816 B2 | 5/2011 | Brittingham et al. | |
| 8,096,767 B1* | 1/2012 | Liang | F01D 5/187 415/115 |
| 8,313,301 B2 | 11/2012 | Hudson | |
| 2009/0180895 A1* | 7/2009 | Brittingham | F01D 5/187 416/97 R |
| 2015/0064010 A1* | 3/2015 | Zhang | F01D 5/186 416/189 |

* cited by examiner

TURBOMACHINE ROTOR BLADE TIP SHROUD CAVITY

FIELD

The present disclosure generally relates to turbomachines. More particularly, the present disclosure relates to rotor blade tip shroud cavities for turbomachines.

BACKGROUND

A gas turbine engine generally includes a compressor section, a combustion section, a turbine section, and an exhaust section. The compressor section progressively increases the pressure of air entering the gas turbine engine and supplies this compressed air to the combustion section. The compressed air and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine engine via the exhaust section.

The turbine section generally includes a plurality of rotor blades. Each rotor blade includes an airfoil positioned within the flow of combustion gases. In this respect, the rotor blades extract kinetic energy and/or thermal energy from the combustion gases flowing through the turbine section. In certain instances, some or all of the rotor blades include a tip shroud coupled to the radially outer ends of the airfoils. As such, the tip shrouds reduce the amount of combustion gases leaking past the rotor blades.

The rotor blades generally operate in extremely high temperature environments. As such, the rotor blades may define various passages, cavities, and apertures through which cooling air may flow. In particular, the tip shrouds may define various cavities therein through which the cooling air flows. Nevertheless, conventional tip shroud cavities require complex manufacturing processes to form. Furthermore, it may be difficult or impossible to add conventional cavities to the tip shrouds once the rotor blades are in service.

BRIEF DESCRIPTION

Aspects and advantages of the technology will be set forth in part in the following description, or may be obvious from the description, or may be learned through practice of the technology.

In one aspect, the present disclosure is directed to a rotor blade for a turbomachine. The rotor blade includes an airfoil having a leading edge and a trailing edge. The airfoil defines a chord extending from the leading edge to the trailing edge. A tip shroud couples to the airfoil and includes a leading edge wall and a trailing edge wall and defines a tip shroud cavity therein. The tip shroud cavity includes a leading edge portion at least partially defined by the leading edge wall and positioned largely upstream of fifty percent of the chord. The tip shroud cavity also includes a trailing edge portion at least partially defined by the trailing edge wall and positioned largely downstream of fifty percent of the chord. An intermediate portion of the tip shroud cavity fluidly couples the leading edge portion of the tip shroud cavity and the trailing edge portion of the tip shroud cavity.

In another aspect, the present disclosure is directed to a turbomachine including a compressor section, a combustion section, and a turbine section. The turbine section includes one or more rotor blades. Each rotor blade includes an airfoil having a leading edge and a trailing edge. The airfoil defines a chord extending from the leading edge to the trailing edge. A tip shroud couples to the airfoil and includes a leading edge wall and a trailing edge wall and defines a tip shroud cavity therein. The tip shroud cavity includes a leading edge portion at least partially defined by the leading edge wall and positioned largely upstream of fifty percent of the chord. The tip shroud cavity also includes a trailing edge portion at least partially defined by the trailing edge wall and positioned largely downstream of fifty percent of the chord. An intermediate portion of the tip shroud cavity fluidly couples the leading edge portion of the tip shroud cavity and the trailing edge portion of the tip shroud cavity.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
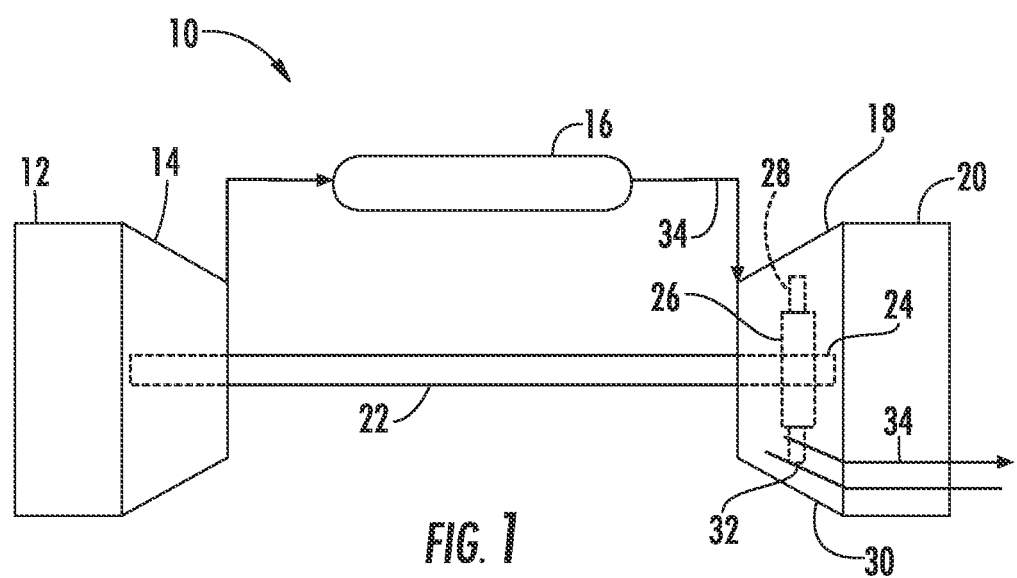
FIG. 1 is a schematic view of an exemplary gas turbine engine in accordance with the embodiments disclosed herein.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine engine is shown and described herein, the present technology as shown and described herein is not limited to a land-based and/or industrial gas turbine engine unless otherwise specified in the claims. For example, the technology as described herein may be used in any type of turbomachine including, but not limited to, aviation gas turbine engines (e.g., turbofans, etc.), steam turbines, and marine gas turbines.

Referring now to the drawings, wherein identical numerals indicate the same elements throughout the figures, FIG. 1 schematically illustrates a gas turbine engine 10. It should be understood that the gas turbine engine 10 of the present disclosure need not be a gas turbine engine, but rather may be any suitable turbomachine, such as a steam turbine engine or other suitable engine. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may generally include a rotor shaft 24 having a plurality of rotor disks 26 (one of which is shown) and a plurality of rotor blades 28 extending radially outward from and being interconnected to the rotor disk 26. Each rotor disk 26, in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, air or another working fluid flows through the inlet section 12 and into the compressor section 14, where the air is progressively compressed to provide pressurized air to the combustors (not shown) in the combustion section 16. The pressurized air mixes with fuel and burns within each combustor to produce combustion gases 34. The combustion gases 34 flow along the hot gas path 32 from the combustion section 16 into the turbine section 18. In the turbine section, the rotor blades 28 extract kinetic and/or thermal energy from the combustion gases 34, thereby causing the rotor shaft 24 to rotate. The mechanical rotational energy of the rotor shaft 24 may then be used to power the compressor section 14 and/or to generate electricity. The combustion gases 34 exiting the turbine section 18 may then be exhausted from the gas turbine engine 10 via the exhaust section 20.

Figure 2:
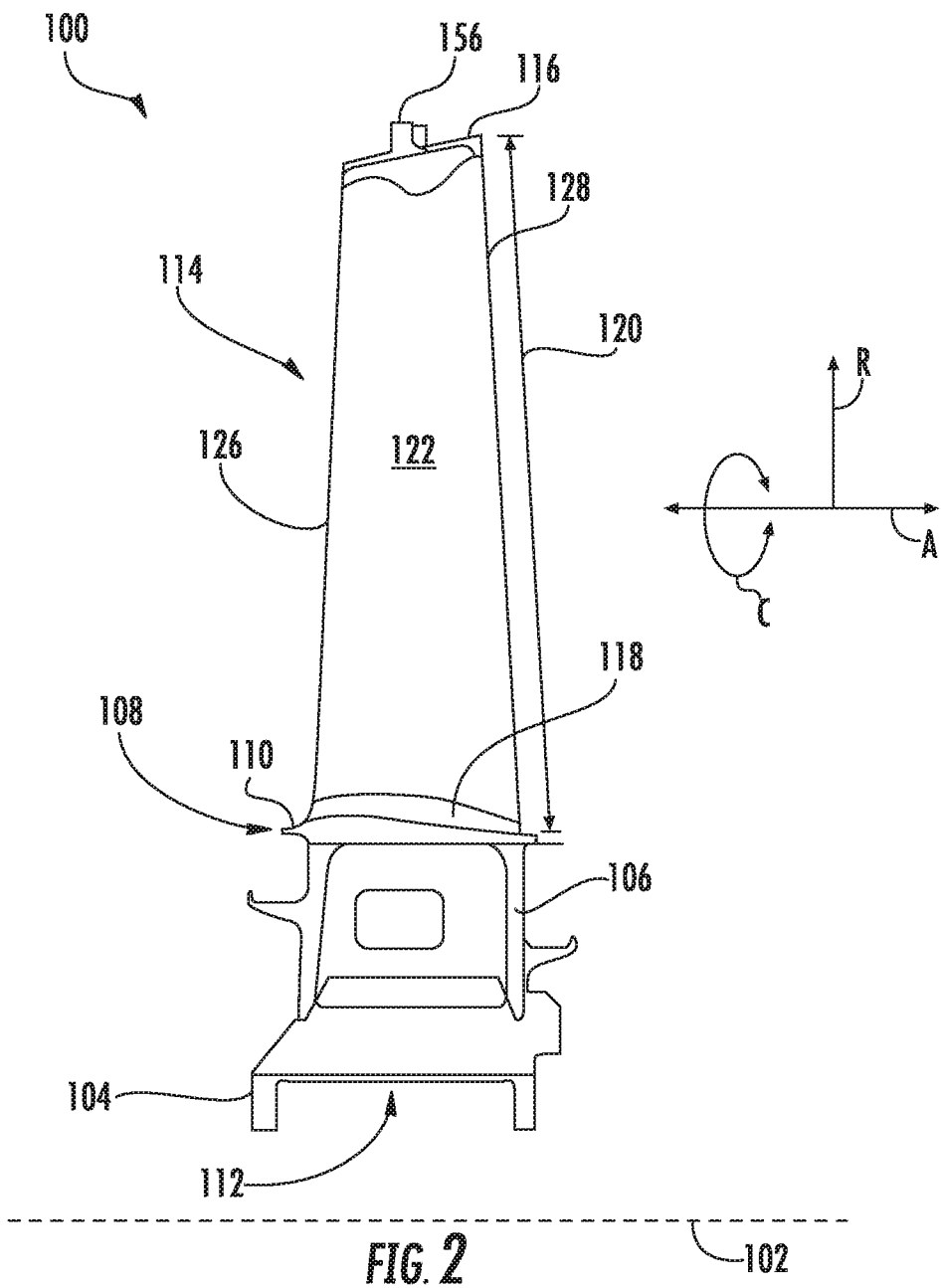
FIG. 2 is a front view of an exemplary rotor blade in accordance with the embodiments disclosed herein.

FIG. 2 is a view of an exemplary rotor blade 100, which may be incorporated into the turbine section 18 of the gas turbine engine 10 in place of the rotor blade 28. As shown, the rotor blade 100 defines an axial direction A, a radial direction R, and a circumferential direction C. In general, the axial direction A extends parallel to an axial centerline 102 of the shaft 24 (FIG. 1), the radial direction R extends generally orthogonal to the axial centerline 102, and the circumferential direction C extends generally concentrically around the axial centerline 102. The rotor blade 100 may also be incorporated into the compressor section 14 of the gas turbine engine 10 (FIG. 1).

As illustrated in FIG. 2, the rotor blade 100 may include a dovetail 104, a shank portion 106, and a platform 108. More specifically, the dovetail 104 secures the rotor blade 100 to the rotor disk 26 (FIG. 1). The shank portion 106 couples to and extends radially outward from the dovetail 104. The platform 108 couples to and extends radially outward from the shank portion 106. The platform 108 includes a radially outer surface 110, which generally serves as a radially inward flow boundary for the combustion gases 34 flowing through the hot gas path 32 of the turbine section 18 (FIG. 1). The dovetail 104, shank portion 106, and platform 108 may define an intake port 112, which permits cooling air (e.g., bleed air from the compressor section 14) to enter the rotor blade 100. In the embodiment shown in FIG. 2, the dovetail 104 is an axial entry fir tree-type dovetail. Alternately, the dovetail 104 may be any suitable type of dovetail. In fact, the dovetail 104, shank portion 106, and/or platform 108 may have any suitable configurations.

Figure 3:
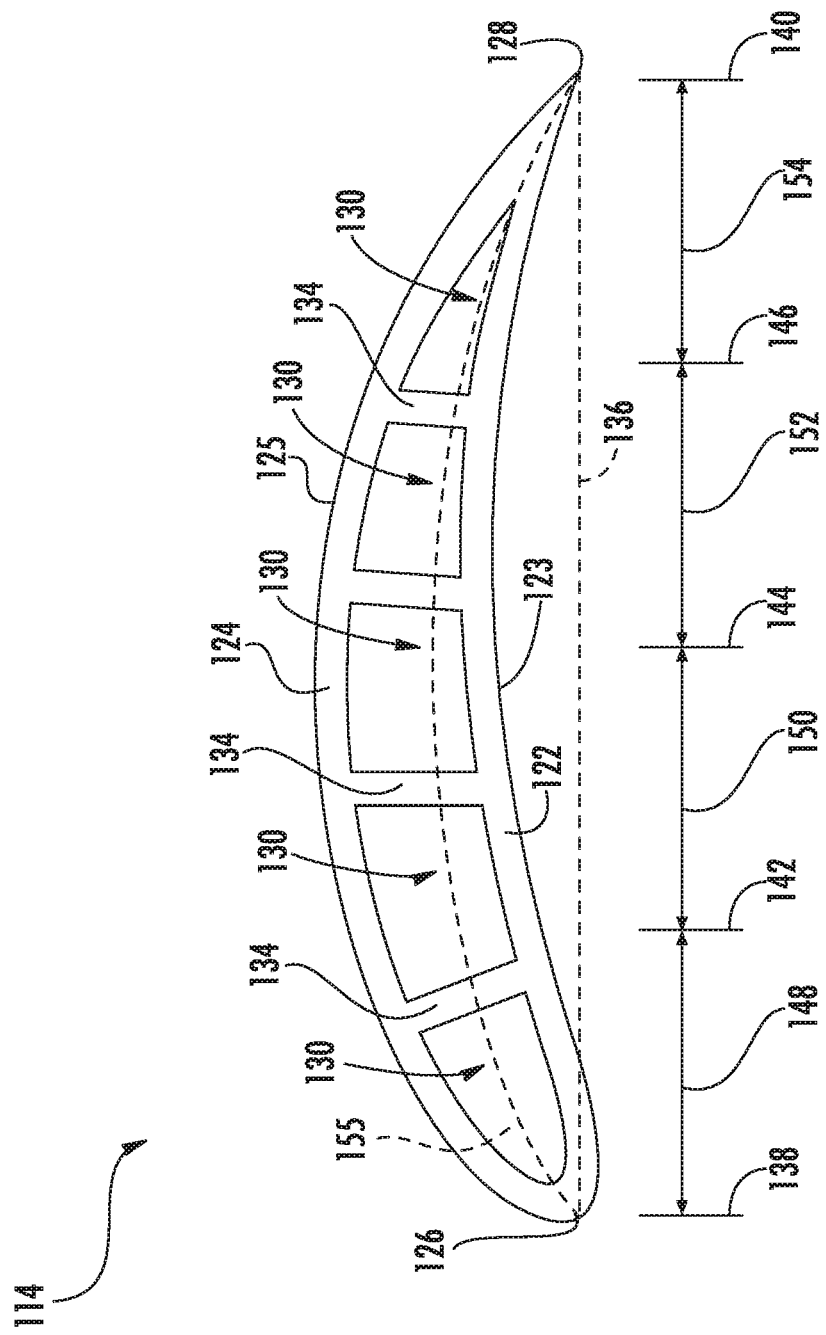
FIG. 3 is a cross-sectional view of an exemplary airfoil in accordance with the embodiments disclosed herein.

Referring now to FIGS. 2 and 3, the rotor blade 100 further includes an airfoil 114. In particular, the airfoil 114 extends radially outward from the radially outer surface 110 of the platform 108 to a tip shroud 116. The airfoil 114 couples to the platform 108 at a root 118 (i.e., the intersection between the airfoil 114 and the platform 116). In this respect, the airfoil 114 defines an airfoil span 120 extending between the root 118 and the tip shroud 116. The airfoil 114 also includes a pressure-side wall 122 defining a pressure-side surface 123 and an opposing suction-side wall 124 defining a suction-side surface 125. The pressure-side wall 122 and the suction-side wall 124 are joined together or interconnected at a leading edge 126 of the airfoil 114, which is oriented into the flow of combustion gases 34 (FIG. 1). The pressure-side wall 122 and the suction-side wall 124 are also joined together or interconnected at a trailing edge 128 of the airfoil 114 spaced downstream from the leading edge 126. The pressure-side wall 122 and the suction-side wall 124 are continuous about the leading edge 126 and the trailing edge 128. The pressure-side wall 122 is generally concave, and the suction-side wall 124 is generally convex.

As shown in FIG. 3, the airfoil 114 may define one or more cooling passages 130 extending therethrough. Each of the cooling passages 130 may be separated by walls 134. The cooling passages 130 may be fluid coupled to the intake port 112. In this respect, cooling air from the intake port 112 may flow through the cooling passages 130, thereby cooling the airfoil 114. At least some of the cooling passages 130 provide cooling air to other parts of the rotor blade 100, such as the tip shroud 116. In the embodiment shown in FIG. 3, for example, the airfoil 114 defines five cooling passages 130. In alternate embodiments, however, the airfoil 114 may define more or fewer cooling passages 130.

The airfoil 114 defines a chord 136 extending from the leading edge 126 to the trailing edge 128. In particular, the leading edge 126 is positioned at zero percent of the chord 136, and the trailing edge 128 is positioned at one hundred percent of the chord 136. As shown in FIG. 3, zero percent of the chord 136 is identified by 138, and one hundred percent of the chord 136 is identified by 140. Furthermore, twenty-five percent of the chord 136 is identified by 142, fifty percent of the chord 136 is identified by 144, and seventy-five percent of the chord 136 is identified by 146. In this respect, the chord 136 may include a first quartile 148 extending from zero percent 138 of the chord 136 to twenty-five percent 142 of the chord 136. Similarly, the chord 136 may include a second quartile 150 extending from twenty-five percent 142 of the chord 136 to fifty percent 144 of the chord 136. The chord 136 may also include a third quartile 152 extending from fifty percent 144 of the chord 136 to seventy-five percent 146 of the chord 136. Furthermore, the chord 136 may include a fourth quartile 154 extending from seventy-five percent 146 of the chord 136 to one hundred percent 140 of the chord 136. Other positions along the chord 136 may be defined as well.

The airfoil 114 also defines a camber line 155. As shown, the camber line 155 extends from the leading edge 126 to the trailing edge 128. The camber line 155 also is positioned between and equidistant from the pressure side surface 123 and the suction side surface 125.

As indicated above, the rotor blade 100 includes the tip shroud 116 coupled to the radially outer end of the airfoil 114. In this respect, the tip shroud 116 may generally define the radially outermost portion of the rotor blade 100. The tip shroud 116 reduces the amount of the combustion gases 34 (FIG. 1) that escape past the rotor blade 100. As shown in FIG. 2, the tip shroud 116 includes a sealing rail 156 extending radially outwardly therefrom. Alternate embodiments may include more sealing rails 156 (e.g., two sealing rails 156, three sealing rails 156, etc.) or no sealing rails 156 at all.

Figure 4:
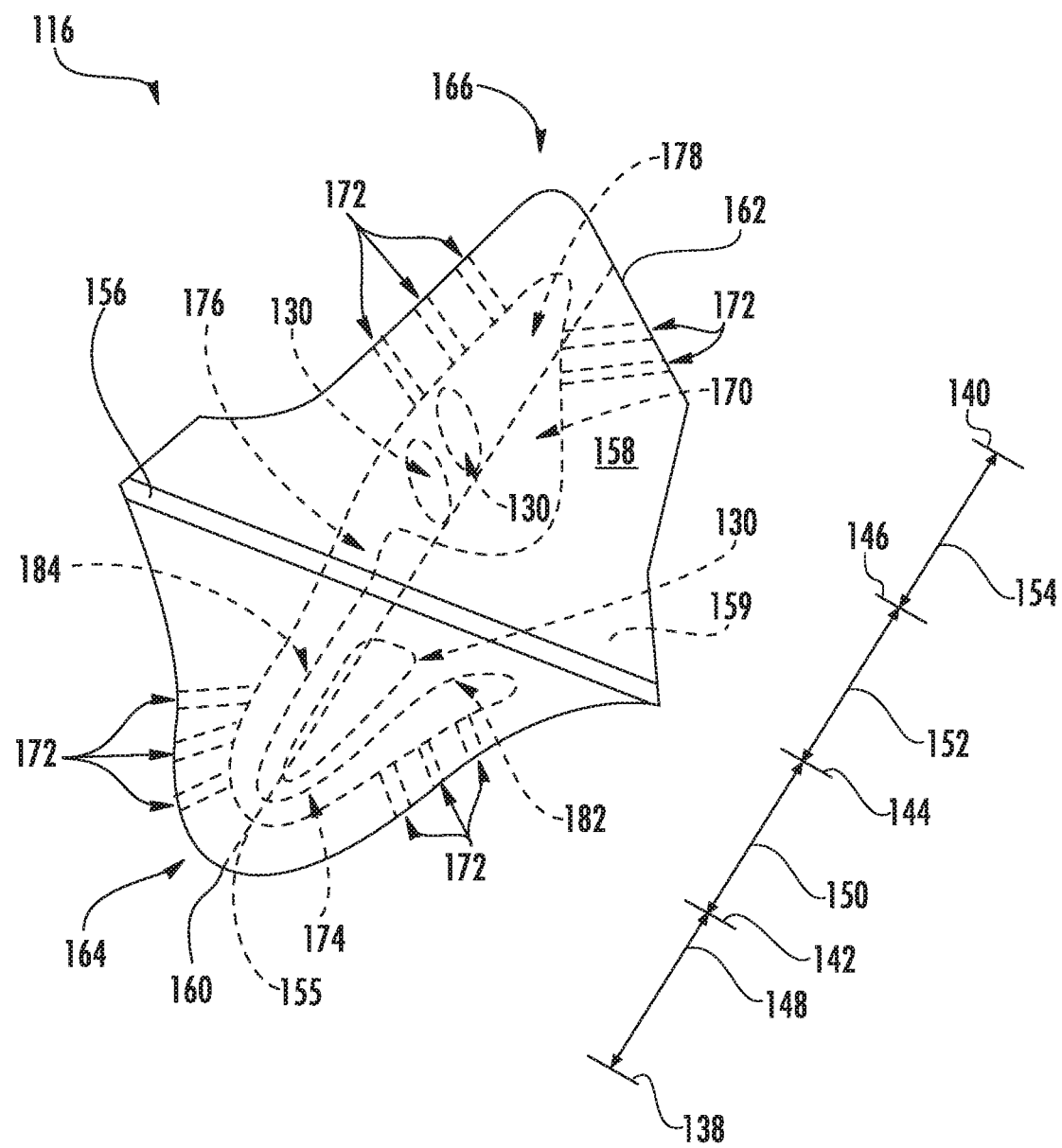
FIG. 4 is a top view of a tip shroud in accordance with the embodiments disclosed herein.
Figure 5:
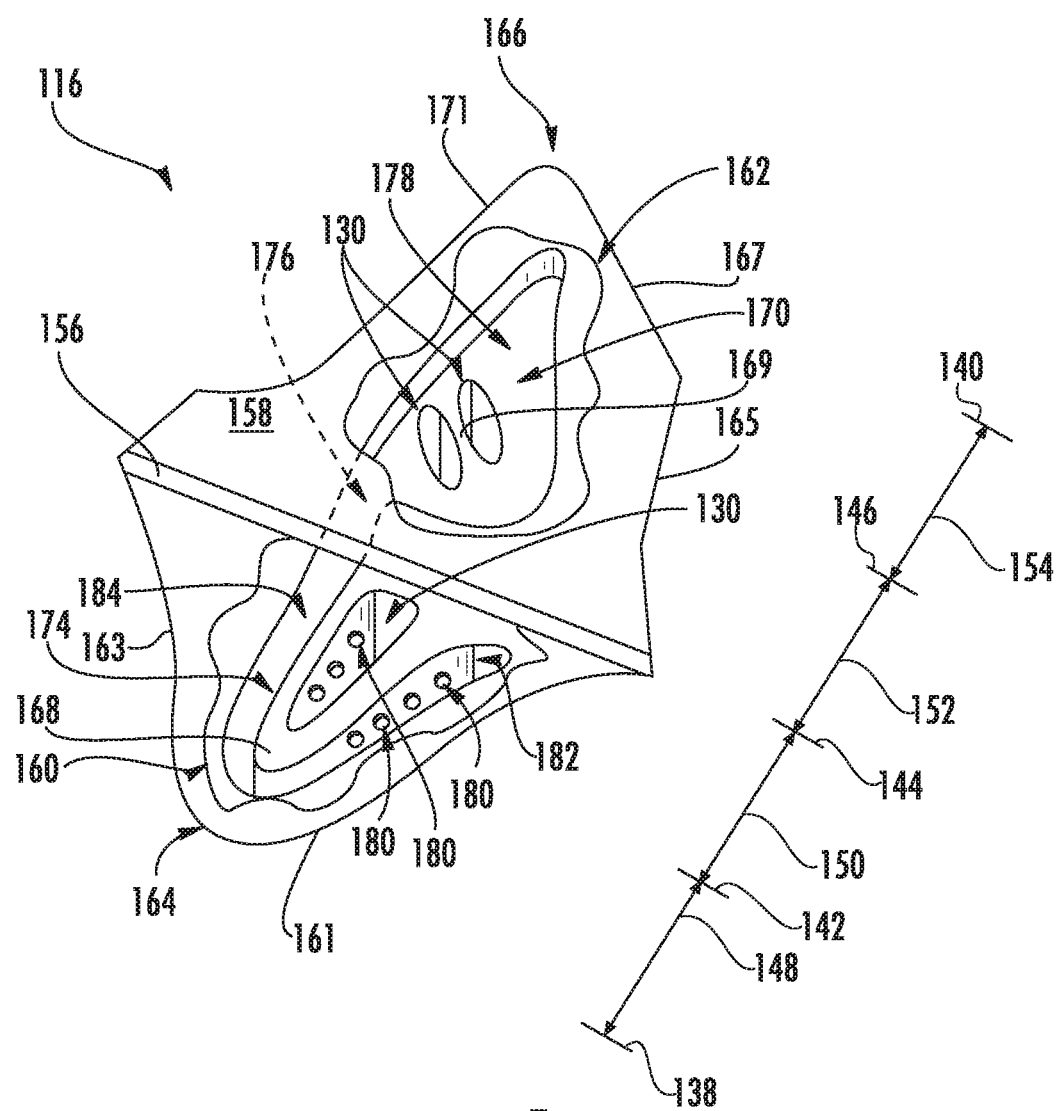
FIG. 5 is a top view of the tip shroud similar to FIG. 4, illustrating internal features thereof in accordance with the embodiments disclosed herein.

FIGS. 4 and 5 illustrate the tip shroud 116 in greater detail. As shown, the tip shroud 116 includes a radially outer surface 158 from which the sealing rail 156 extends radially outward. The tip shroud 116 also includes a leading edge wall 160 and a trailing edge wall 162. In particular, the leading edge wall 160 is positioned proximate to the leading edge 126 of the airfoil 114. For example, the leading edge wall 160 may be positioned between zero percent 138 of the chord 136 and fifty percent 144 of the chord 136. The trailing edge wall 162 is positioned proximate to the trailing edge 128 of the airfoil 114. As such, the trailing edge wall 162 may be positioned between fifty percent 144 of the chord 136 and one hundred percent 140 of the chord 136. In this respect, the leading edge wall 160 may form at least part of a leading edge portion 164 of the tip shroud 116. Similarly, the trailing edge wall 162 may form at least part of a trailing edge portion 166 of the tip shroud 116.

As will be discussed in greater detail below, the tip shroud 116 defines various passages, cavities, and apertures to facilitate cooling thereof. In this respect, FIG. 4 is a top view of the tip shroud 116, illustrating the various passages, cavities, and apertures with dashed lines. FIG. 5 is a top view of the tip shroud 116 with sections of the radially outer surface 158 thereof removed to illustrate portions the various passages, cavities, and apertures.

As shown in FIGS. 4 and 5, the tip shroud 116 defines a portion of at least some of the cooling passages 130. In particular, ribs 168, 169 in the tip shroud 116 may define portions of the cooling passages 130. As indicated above, certain cooling passages 130 may supply cooling air from the intake port 112 (FIG. 2) to the tip shroud 116 for cooling the tip shroud 116. In the embodiment shown, the tip shroud 116 defines portions of three cooling passages 130. In alternate embodiments, the tip shroud 116 may define portions of more or fewer cooling passages 130. In further alternate embodiments, the cooling passages 130 may be in the form of substantially circular cooling holes or other polygonal shapes.

The tip shroud 116 also defines a tip shroud cavity 170 in fluid communication with at least one of the cooling passages 130. In this respect, the tip shroud cavity 170 may provide cooling air to various parts of the tip shroud 116, such as the leading edge wall 160 and the trailing edge wall 162. Furthermore, the tip shroud cavity 170 may act as a plenum to supply cooling air to one or more cooling apertures 172. As shown, the tip shroud cavity 170 is a single, continuous and uninterrupted cavity that includes a leading edge portion 174, an intermediate portion 176, and a trailing edge portion 178. The intermediate portion 176 fluidly couples the leading edge portion 174 and the trailing edge portion 178.

As shown, the leading edge portion 174 of the tip shroud cavity 170 is generally positioned in the leading edge portion 164 of the tip shroud 116. More specifically, the leading edge portion 174 of the tip shroud cavity 170 is largely positioned upstream of about fifty percent 144 of the chord 136, such as the between zero percent 138 of the chord 136 and fifty percent 144 of the chord 136. The leading edge portion 174 of the tip shroud cavity 170 may also be positioned largely upstream of the sealing rail 156, such as between the leading edge wall 160 and the sealing rail 156. In this respect, the leading edge portion 174 of the tip shroud cavity 170 is at least partially defined by leading edge wall 160 of the tip shroud 116. Furthermore, the leading edge portion 174 of the tip shroud cavity 170 may be partially defined by the rib 168. As such, the rib 168 may define one or more transfer apertures 180 that fluidly couple the cooling passage 130 and the leading edge portion 174 of the tip shroud cavity 170. In certain embodiments, the leading edge portion 174 of the tip shroud cavity 170 is entirely positioned upstream of fifty percent 144 of the chord 136.

The leading edge portion 174 of the tip shroud cavity 170 may include a first section 182 and a second section 184. As shown in FIGS. 4 and 5, the first section 182 and the second section 184 may be aligned along the camber line 155. In this respect, the leading edge portion 174 of the tip shroud cavity 170 may have a U-shaped or V-shaped cross section. In particular embodiments, the leading edge portion 174 of the tip shroud cavity 170 may partially surround the cooling passage 130. In such embodiments, the first section 182, the second section 184, and the cooling passage 130 may be aligned along the camber line 155. For example, the first section 182 may be positioned on the pressure-side of the cooling passage 130, and the second section 184 may be positioned on the suction-side of the cooling passage 130. In other embodiments, the leading edge portion 174 of the tip shroud cavity 170 has a cross section, or portions thereof, that generally match the contour, or portions thereof, of tip shroud walls 161, 163. Although, the leading edge portion 174 of the tip shroud cavity 170 may have any suitable cross-section and/or configuration.

The trailing edge portion 178 of the tip shroud cavity 170 is generally positioned in the trailing edge portion 166 of the tip shroud 116. More specifically, the trailing edge portion 174 of the tip shroud cavity 170 is largely positioned downstream of about fifty percent 144 of the chord 136, such as the between fifty percent 144 of the chord 136 and one hundred percent 140 of the chord 136. The trailing edge portion 178 of the tip shroud cavity 170 may also be positioned largely downstream of the sealing rail 156, such as between the sealing rail 156 and the trailing edge wall 162. In certain embodiments, the trailing edge portion 178 of the tip shroud cavity 170 is entirely positioned downstream of fifty percent 144 of the chord 136. In this respect, the trailing edge portion 178 of the tip shroud cavity 170 is at least partially defined by the trailing edge wall 162 of the tip shroud 116. As shown, trailing edge portion 178 of the tip shroud cavity 170 may have a triangular cross-section. In other embodiments, the trailing edge portion 178 of the tip shroud cavity 170 has a cross section, or portions thereof, that generally matches the contour, or portions thereof, of tip shroud walls 165, 167, 171. Although, the trailing edge portion 178 of the tip shroud cavity 170 may have any suitable cross-section and/or configuration.

The leading edge and trailing edge portions 174, 178 of the tip shroud cavity 170 may have any suitable sizes. For example, the trailing edge portion 178 of the tip shroud cavity 170 may have a smaller volume than the leading edge portion 174 of the tip shroud cavity 170. Alternately, the trailing edge portion 178 of the tip shroud cavity 170 may have the same volume as or a smaller volume than the leading edge portion 174 of the tip shroud cavity 170. The majority of the cross-sectional surface area of the leading edge portion 174 of the tip shroud cavity 170 may occupy the cross-sectional surface area of the tip shroud 116 located between zero percent 138 of the chord 136 and about fifty percent 144 of the chord 136. For example, about fifty-one percent, sixty percent, seventy percent, eighty percent, ninety percent, or more of the cross-sectional area of the leading edge portion 174 of the tip shroud cavity 170 may occupy the cross-sectional surface area of the tip shroud 116 located between zero percent 138 of the chord 136 and about fifty percent 144 of the chord 136. Furthermore, the cross-sectional surface area of the leading edge portion 174 of the tip shroud cavity 170 may occupy at least twenty-five percent, fifty percent, seventy-five percent, or more of the cross-sectional surface area of the tip shroud 116 located between zero percent 138 of the chord 136 and about fifty percent 144 of the chord 136 (i.e., the leading edge portion 164). Similarly, the majority of the cross-sectional surface area of the trailing edge portion 178 of the tip shroud cavity 170 may occupy the cross-sectional surface area of the tip shroud 116 located between about fifty percent 144 of the chord 136 and one hundred percent 140 of the chord 136. For example, about fifty-one percent, sixty percent, seventy percent, eighty percent, ninety percent, or more of the cross-sectional area of the trailing edge portion 178 of the tip shroud cavity 170 may occupy the cross-sectional surface area of the tip shroud 116 located between about fifty percent 133 of the chord 136 and one hundred percent 140 of the chord 136. The cross-sectional surface area of the trailing edge portion 178 of the tip shroud cavity 170 may occupy at least twenty-five percent, fifty percent, seventy-five percent, or more of the cross-sectional surface area of the tip shroud 116 located between about fifty percent 144 of the chord 136 and one hundred percent 140 of the chord 136 (i.e., the trailing edge portion 166). The cross-sectional surface areas mentioned above generally follow the contour of surface 158.

As mentioned above, the intermediate portion 176 fluidly couples the leading edge portion 174 and the trailing edge portion 178. In this respect, the intermediate portion 176 extends across the fifty percent 144 of the chord 136 position. Furthermore, intermediate portion 176 may extend under the sealing rail 156.

The tip shroud 116 may define one or more cooling apertures 172 that provide film cooling to various exterior surfaces of the tip shroud 116. In this respect, the cooling apertures 172 are fluidly coupled to the tip shroud cavity 170. In the embodiment shown in FIGS. 4 and 5, the leading edge wall 160 defines six cooling apertures 172 extending from the leading edge portion 174 of the tip shroud cavity 170 to the hot gas path 32 (FIG. 1). Similarly, the trailing edge wall 162 defines five cooling apertures 172 extending from the trailing edge portion 178 of the tip shroud cavity 170 to the hot gas path 32. In alternate embodiments, the leading edge and trailing edge walls 160, 162 may define more or fewer cooling apertures 172. In further alternate embodiments, one or more cooling apertures 172 extend from the leading and/or trailing edge cavities 174, 178 to outer surface 158. In still further alternate embodiments, one or more cooling apertures 172 extend from the leading and/or trailing edge cavities 174, 178 to a radially inner surface 159 of tip shroud 116.

In operation, the tip shroud cavity 170 provides cooling to the tip shroud 116. More specifically, cooing air (e.g., bleed air from the compressor section 14) enters the rotor blade 100 through the intake port 112 (FIG. 2). At least a portion of this cooling flows through the cooling passages 130 to the tip shroud 116. Once in the tip shroud 116, the cooling air flows from the cooling passages 130 into the leading edge and trailing edge portions 174, 178 of the tip shroud cavity 170. In particular, the cooling air may flow through the transfer apertures 180 into the leading edge portion 174 of the tip shroud cavity 170. A portion of the cooling air may flow through from the leading edge portion 174 of the tip shroud cavity 170 through the intermediate portion 176 to the trailing edge portion 176 of the tip shroud cavity 170. The cooling air in the tip shroud cavity 170 may convectively cool the walls and surfaces of the tip shroud 116 that define the tip shroud cavity 116, such as the leading edge wall 160, the trailing edge wall 162, the radially outer surface 158, and the radially inner surface 159. The cooling air may then exit the tip shroud cavity 170 through the cooling apertures 172. In this respect, the tip shroud cavity 170 may act as a plenum to provide cooling air to the cooling apertures 172, which provide film cooling to the exterior surfaces of the tip shroud 116. In alternate embodiments, the cooling air in the tip shroud cavity 170 may be recirculated through the rotor blade 100.

As discussed in greater detail above, the tip shroud cavity 170 includes the leading edge portion 174, the intermediate portion 176, and the trailing edge portion 178. The leading edge portion 174 is at least partially defined by the leading edge wall 160, and the trailing edge portion 178 is at least partially defined by the trailing edge wall 162. The intermediate portion 176 fluidly couples the leading edge portion 174 and the trailing edge portion 178. In this respect, the tip shroud cavity 170 is a single, continuous cavity that provides cooling air to both the leading edge portion 164 of the tip shroud 116 and the trailing edge portion 166 of the tip shroud 116. The configuration of the tip shroud cavity 170 (i.e., the continuous leading edge, the intermediate, and trailing edge portions 174, 176, 178) permits the tip shroud cavity 170 to be formed (e.g., via machining) after the rotor blade 100 is cast. In this respect, the tip shroud cavity 170 simplifies manufacturing of the rotor blade 100 compared to conventional tip shroud cavities, which are generally formed during casting. Furthermore, the tip shroud cavity 170, unlike conventional tip shroud cavities, may be added to the rotor blade 100 after the rotor blade 100 has been in service since the tip shroud cavity 170 may be machined into the tip shroud 116.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade for a turbomachine, the rotor blade operably connected to a rotor disk for rotation about a central axis of the turbomachine, the rotor blade comprising:
    an airfoil including a leading edge, a trailing edge, a pressure side surface, and a suction side surface, the airfoil defining a chord extending from the leading edge to the trailing edge; and
    a tip shroud coupled to the airfoil, the tip shroud including a leading edge wall, a trailing edge wall, a radially outer surface, and a radially inner surface and defining a tip shroud cavity therein, the tip shroud cavity comprising:
        a leading edge portion at least partially defined by the leading edge wall and positioned upstream of fifty percent of the chord, the leading edge portion having a U-shaped cross section with a pressure side section and a suction side section;
        a trailing edge portion at least partially defined by the trailing edge wall and positioned downstream of fifty percent of the chord; and
        an intermediate portion fluidly coupling the leading edge portion and the trailing edge portion on one of a pressure side or a suction side of the chord,
        wherein the leading edge portion is fluidly isolated from the trailing edge portion on the other of the pressure side or suction side of the chord.

2. The rotor blade of claim 1, further comprising:
    a sealing rail extending outward from the tip shroud, wherein the leading edge portion of the tip shroud cavity is positioned between the leading edge wall and the sealing rail, and wherein the trailing edge portion of the tip shroud cavity is positioned between the sealing rail and the trailing edge wall.

3. The rotor blade of claim 1, wherein the airfoil and tip shroud define a cooling passage fluidly coupled to the tip shroud cavity for supplying cooling air to the tip shroud cavity.

4. The rotor blade of claim 3, wherein the tip shroud comprises a rib that partially defines the cooling passage and the leading edge portion of the tip shroud cavity.

5. The rotor blade of claim 4, wherein the rib defines a transfer aperture extending from the cooling passage to the leading edge portion of the tip shroud cavity.

6. The rotor blade of claim 3, wherein the leading edge portion of the tip shroud cavity comprises a first section and a second section, and wherein the first section and the second section are aligned along a camber line.

7. The rotor blade of claim 6, wherein the first section of the leading edge portion of the tip shroud cavity, the second section of the leading edge portion of the tip shroud cavity, and the cooling passage are aligned along the camber line.

8. The rotor blade of claim 1, wherein at least one of the leading edge wall, the trailing edge wall, the radially outer surface, or the radially inner surface defines at least one cooling aperture in fluid communication with the tip shroud cavity.

9. The rotor blade of claim 1, wherein the trailing edge portion of the tip shroud cavity comprises a smaller volume than the leading edge portion of the tip shroud cavity.

10. The rotor blade of claim 1, wherein the leading edge portion of the tip shroud cavity occupies at least twenty-five percent of a surface area of the tip shroud located between zero percent of the chord and fifty percent of the chord.

11. The rotor blade of claim 1, wherein the trailing edge portion of the tip shroud cavity occupies at least twenty-five percent of a surface area of the tip shroud located between fifty percent of the chord and one hundred percent of the chord.

12. The rotor blade of claim 1, wherein the trailing edge portion of the tip shroud cavity is triangular.

* * * * *